(12) United States Patent
Gries et al.

(10) Patent No.: US 11,553,717 B2
(45) Date of Patent: Jan. 17, 2023

(54) COMPOUNDS, COMPOSITIONS AND METHODS FOR ATTRACTING AND/OR ARRESTING BED BUGS

(71) Applicant: SIMON FRASER UNIVERSITY, Burnaby (CA)

(72) Inventors: Regine M. Gries, Coquitlam (CA); Robert A. Britton, North Vancouver (CA); Michael T. Holmes, Coquitlam (CA); Gerhard J. Gries, Coquitlam (CA)

(73) Assignee: Simon Fraser University, Burnaby (CA)

( * ) Notice: Subject to any disclaimer, the term of this patent is extended or adjusted under 35 U.S.C. 154(b) by 85 days.

(21) Appl. No.: 17/236,521

(22) Filed: Apr. 21, 2021

(65) Prior Publication Data

US 2021/0235698 A1    Aug. 5, 2021

Related U.S. Application Data

(63) Continuation of application No. 15/105,676, filed as application No. PCT/CA2014/051218 on Dec. 16, 2014, now abandoned.

(60) Provisional application No. 62/018,465, filed on Jun. 27, 2014, provisional application No. 61/917,048, filed on Dec. 17, 2013.

(51) Int. Cl.
| | | |
|---|---|---|
| *A01N 25/08* | (2006.01) | |
| *A01N 25/18* | (2006.01) | |
| *A01N 31/02* | (2006.01) | |
| *A01N 31/04* | (2006.01) | |
| *A01N 33/08* | (2006.01) | |
| *A01N 35/02* | (2006.01) | |
| *A01N 35/04* | (2006.01) | |
| *A01N 35/06* | (2006.01) | |
| *A01N 37/02* | (2006.01) | |
| *A01N 43/50* | (2006.01) | |
| *A01M 1/02* | (2006.01) | |
| *A01M 1/20* | (2006.01) | |

(52) U.S. Cl.
CPC .............. *A01N 43/50* (2013.01); *A01M 1/023* (2013.01); *A01M 1/2011* (2013.01); *A01M 1/2094* (2013.01); *A01N 25/08* (2013.01); *A01N 25/18* (2013.01); *A01N 31/02* (2013.01); *A01N 31/04* (2013.01); *A01N 33/08* (2013.01); *A01N 35/02* (2013.01); *A01N 35/04* (2013.01); *A01N 35/06* (2013.01); *A01N 37/02* (2013.01)

(58) Field of Classification Search
None
See application file for complete search history.

(56) References Cited

U.S. PATENT DOCUMENTS

| | | |
|---|---|---|
| 5,133,959 A | 7/1992 | Kumins |
| 6,267,953 B1 | 7/2001 | Bernier et al. |
| 6,800,279 B2 | 10/2004 | Bernier et al. |
| 7,892,528 B2 | 2/2011 | Siljander et al. |
| 8,889,731 B2 | 11/2014 | Gries et al. |
| 9,789,044 B2 | 10/2017 | Gries et al. |

FOREIGN PATENT DOCUMENTS

| | | |
|---|---|---|
| CA | 2140920 A1 | 3/1994 |
| CA | 2393452 A1 | 2/2001 |
| CA | 2591560 A1 | 6/2006 |
| WO | 2008088546 A2 | 7/2008 |
| WO | 2010105029 A2 | 9/2010 |

OTHER PUBLICATIONS

Hughes et al., The Absorption Of Soluble, Volatile Fatty Acids, J. Biol. Chem., vol. 108, pp. 141-144. (Year: 1935).
Ba et al. Korean. J. Food Sci. Ani. Resour., vol. 30, No. 1, pp. 73-86. (Year: 2010).
Udomsil et al., Journal of Agricultural and Food Chemistry, vol. 59, pp. 8401-8408 (Year: 2011).
Patent Examination Report No. 1 issued by IP Australia in related Application No. 2014366768 dated Sep. 28, 2016 (3 pages).
Notice of acceptance issued by IP Australia in related Application No. 2014366768 dated Sep. 28, 2017 (3 pages).
The Merck Index, 11th Edition, Histamine, p. 745. (Year: 1989).
Harraca, Vincent et al., "Characterization of the antennal olfactory system of the bed bug (*Cimex lectularius*)," Chem Senses, 35(3), p. 195-204 (Epub Dec. 23, 2009) (10 pages).
Nilssen, Arne C. et al., "Dimethyl trisulphide is a strong attractant for some calliphorids and a muscid but not for the reindeer oestrids Hypoderma tarandi and Cephenemyia trompe," Entomologia Experimentalis Applicata, Abstract retrieved from https://doi.org/10.1111/j.1570-7458.1996.tb00828.x on May 26, 2021 (2 pages).

*Primary Examiner* — Alton N Pryor
(74) *Attorney, Agent, or Firm* — Ulmer & Berne LLP

(57) ABSTRACT

Disclosed is a composition of volatile and less-volatile pheromone components that can be used alone or in combination with other compounds to attract and/or arrest bed bugs of both sexes and all developmental stages. This blend can be used to bait traps that are effective in capturing bed bugs in infested premises or can be combined with a pesticide that is lethal to bed bugs.

20 Claims, 1 Drawing Sheet

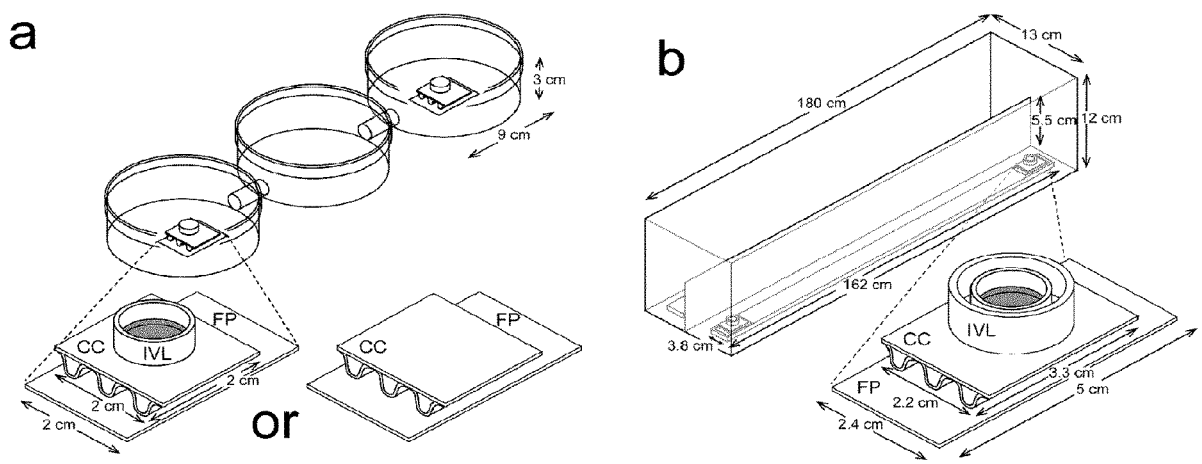

COMPOUNDS, COMPOSITIONS AND METHODS FOR ATTRACTING AND/OR ARRESTING BED BUGS

FIELD OF THE INVENTION

This invention pertains to compounds, compositions and methods for attracting and/or arresting bed bugs.

BACKGROUND OF THE INVENTION

For many years, from the end of World War II until the final decade of the 20$^{th}$ century, much of the world was free from infestation by the common bed bug, Cimex lectularius (Heteroptera: Cimicidae). This is attributed to modern hygienic measures and the widespread use of DDT and other persistent insecticides (Potter 2012). However, in the last two decades there has been a world-wide resurgence, with bed bugs becoming common urban pests (Boase 2001; Myles et al. 2003; Jones 2004), and sometimes causing debilitating skin irritation and lesions (Ter Porten et al. 2005). This resurgence has renewed interest in detecting, monitoring and controlling bed bug infestations, particularly the development of effective compounds, compositions and methods for attracting and/or arresting bed bugs.

SUMMARY OF THE INVENTION

The inventions described herein have many aspects.

In one aspect, a composition for attracting and/or arresting blood-feeding insects is provided. The composition comprises histamine. The composition may further comprise volatile compounds, such as sulfides, aldehydes and ketones, for example dimethyl disulfide, dimethyl trisulfide, (E)-2-hexenal, (E)-2-octenal and 2-hexanone. The volatile compounds may comprise, by weight, 0.5-99% dimethyl disulfide, 0.5-99% dimethyl trisulfide, 0.5-99% (E)-2-hexenal, 0.5-99% (E)-2-octenal and 0.5-99% 2-hexanone. The composition may further comprise an effective amount of one or more additional compounds, such as butanal, pentanal, hexanal, benzaldehyde, benzyl alcohol, acetophenone, verbenone, ethyl octanoate, methyl octanoate, pentyl hexanoate, dimethylaminoethanol, N-acetylglucosamine, L-3-hydroxykynurenine O-sulfate, L-valine, L-alanine, octanal, nonanal, decanal, (E,E)-2,4-octadienal, (E,Z)-2,4-octadienal, benzyl acetate, (+)-limonene, (−)-limonene, 6-methyl-5-hepten-2-one (sulcatone), geranylacetone, carbon dioxide, 1-octen-3-ol, L-carvone, L-lactic acid, proprionic acid, butyric acid, valeric acid, oleic acid, palmitic acid, stearic acid, linoleic acid, lauric acid, capric acid, myristic acid, androstenone, 3-methyl indole, 1-docosanol, pentadecanoic acid, squalene, cholesterol, and 2,2-dimethy1-1,3-dioxolane-4-methanol.

The histamine may be a histamine base. The composition may be formulated as a granule, powder, dust, paste, gel, suspension, emulsion or liquid solution. The composition may be formulated as a slow-release lure. The histamine component of the composition may be formulated as a slow-release lure. The blend of dimethyl disulfide, dimethyl trisulfide, (E)-2-hexenal, (E)-2-octenal and 2-hexanone may be formulated as a slow-release lure. The blend of dimethyl disulfide, dimethyl trisulfide, (E)-2-hexenal, (E)-2-octenal and 2-hexanone combined with the effective amount of the one or more additional compounds may be formulated as a slow-release lure. The one or more additional compounds may be selected from the group consisting of butanal, pentanal, hexanal, benzaldehyde, benzyl alcohol, acetophenone, verbenone, ethyl octanoate, methyl octanoate, pentyl hexanoate, dimethylaminoethanol, N-acetylglucosamine, L-3-hydroxykynurenine O-sulfate, L-valine, L-alanine, octanal, nonanal, decanal, (E,E)-2,4-octadienal, (E,Z)-2,4-octadienal, benzyl acetate, (+)-limonene, (−)-limonene, 6-methyl-5-hepten-2-one (sulcatone), geranylacetone, carbon dioxide, 1-octen-3-ol, L-carvone, L-lactic acid, proprionic acid, butyric acid, valeric acid, oleic acid, palmitic acid, stearic acid, linoleic acid, lauric acid, capric acid, myristic acid, androstenone, 3-methyl indole, 1-docosanol, pentadecanoic acid, squalene, cholesterol, and 2,2-dimethyl-1,3-dioxolane-4-methanol.

In another aspect, a composition for attracting and/or arresting blood-feeding insects is provided, wherein the active ingredient of the composition essentially consists of histamine.

In another aspect, a composition for attracting and/or arresting blood-feeding insects is provided, wherein the active ingredient of the composition essentially consists of dimethyl disulfide, dimethyl trisulfide, (E)-2-hexenal, (E)-2-octenal and 2-hexanone.

In another aspect, a composition for attracting and/or arresting blood-feeding insects is provided, wherein the active ingredient of the composition essentially consists of histamine, dimethyl disulfide, dimethyl trisulfide, (E)-2-hexenal, (E)-2-octenal and 2-hexanone.

In another aspect, a composition for attracting and/or arresting blood-feeding insects is provided, wherein the active ingredient of the composition essentially consists of dimethyl disulfide, dimethyl trisulfide, (E)-2-hexenal, (E)-2-octenal and 2-hexanone combined with an effective amount of one or more additional compounds selected from the group consisting of butanal, pentanal, hexanal, benzaldehyde, benzyl alcohol, acetophenone, verbenone, ethyl octanoate, methyl octanoate, pentyl hexanoate, dimethylaminoethanol, N-acetylglucosamine, L-3-hydroxykynurenine O-sulfate, L-valine, L-alanine, octanal, nonanal, decanal, (E,E)-2,4-octadienal, (E,Z)-2,4-octadienal, benzyl acetate, (+)-limonene, (−)-limonene, 6-methyl-5-hepten-2-one (sulcatone), geranylacetone, carbon dioxide, 1-octen-3-ol, L-carvone, L-lactic acid, proprionic acid, butyric acid, valeric acid, oleic acid, palmitic acid, stearic acid, linoleic acid, lauric acid, capric acid, myristic acid, androstenone, 3-methyl indole, 1-docosanol, pentadecanoic acid, squalene, cholesterol, and 2,2-dimethyl-1,3-dioxolane-4-methanol.

In another aspect, a composition for attracting and/or arresting blood-feeding insects is provided, wherein the active ingredient of the composition essentially consists of histamine, dimethyl disulfide, dimethyl trisulfide, (E)-2-hexenal, (E)-2-octenal and 2-hexanone combined with an effective amount of one or more additional compounds selected from the group consisting of butanal, pentanal, hexanal, benzaldehyde, benzyl alcohol, acetophenone, verbenone, ethyl octanoate, methyl octanoate, pentyl hexanoate, dimethylaminoethanol, N-acetylglucosamine, L-3-hydroxykynurenine O-sulfate, L-valine, L-alanine, octanal, nonanal, decanal, (E,E)-2,4-octadienal, (E,Z)-2,4-octadienal, benzyl acetate, (+)-limonene, (−)-limonene, 6-methyl-5-hepten-2-one (sulcatone), geranylacetone, carbon dioxide, 1-octen-3-ol, L-carvone, L-lactic acid, proprionic acid, butyric acid, valeric acid, oleic acid, palmitic acid, stearic acid, linoleic acid, lauric acid, capric acid, myristic acid, androstenone, 3-methyl indole, 1-docosanol, pentadecanoic acid, squalene, cholesterol, and 2,2-dimethyl-1,3-dioxolane-4-methanol.

In another aspect, a method for attracting and/or arresting blood-feeding insects is provided. The method comprises providing a composition as described herein at a desired location. The histamine may be provided in a slow-release device comprising an absorbent material, such as a cellulose mat, impregnated with the histamine. The dimethyl disulfide, dimethyl trisulfide, (E)-2-hexenal, (E)-2-octenal and 2-hexanone may be provided in a slow-release device comprising a gas-permeable sealed reservoir loaded with the dimethyl disulfide, dimethyl trisulfide, (E)-2-hexenal, (E)-2-octenal and 2-hexanone. The dimethyl disulfide, dimethyl trisulfide, (E)-2-hexenal, (E)-2-octenal and 2-hexanone and the one or more additional compounds may be provided in a slow-release device comprising a gas-permeable sealed reservoir loaded with the dimethyl disulfide, dimethyl trisulfide, (E)-2-hexenal, (E)-2-octenal and 2-hexanone and the one or more additional compounds, wherein the one or more additional compounds are selected from the group consisting of butanal, pentanal, hexanal, benzaldehyde, benzyl alcohol, acetophenone, verbenone, ethyl octanoate, methyl octanoate, pentyl hexanoate, dimethylaminoethanol, N-acetylglucosamine, L-3-hydroxykynurenine O-sulfate, L-valine, L-alanine, octanal, nonanal, decanal, (E,E)-2,4-octadienal, (E,Z)-2,4-octadienal, benzyl acetate, (+)-limonene, (−)-limonene, 6-methyl-5-hepten-2-one (sulcatone), geranylacetone, carbon dioxide, 1-octen-3-ol, L-carvone, L-lactic acid, proprionic acid, butyric acid, valeric acid, oleic acid, palmitic acid, stearic acid, linoleic acid, lauric acid, capric acid, myristic acid, androstenone, 3-methyl indole, 1-docosanol, pentadecanoic acid, squalene, cholesterol, and 2,2-dimethyl-1,3-dioxolane-4-methanol. The blood-feeding insect may be the common bed bug, *Cimex lectularius*, or the tropical bed bug, *C. hemipterus*. The desired location may be in, on or near a bed bug control device. The bed bug control device may be a detector, monitor or trap. The slow-release devices may be placed in the detector, monitor or trap. The method may further comprise combining the composition with a source of heat. The method may further comprise combining the composition with a source of carbon dioxide. The method may further comprise combining the composition with a pesticide that is lethal to bed bugs.

In another aspect the use of histamine for attracting and/or arresting blood-feeding insects is provided. The blood-feeding insect may be the common bed bug, *Cimex lectularius*, or the tropical bed bug, *C. hemipterus*.

In another aspect the use of dimethyl disulfide, dimethyl trisulfide, (E)-2-hexenal, (E)-2-octenal and 2-hexanone for attracting and/or arresting blood-feeding insects is provided. The blood-feeding insect may be the common bed bug, *Cimex lectularius*, or the tropical bed bug, *C. hemipterus*.

In another aspect the use of dimethyl disulfide, dimethyl trisulfide, (E)-2-hexenal, (E)-2-octenal and 2-hexanone combined with an effective amount of one or more additional compounds selected from the group consisting of butanal, pentanal, hexanal, benzaldehyde, benzyl alcohol, acetophenone, verbenone, ethyl octanoate, methyl octanoate, pentyl hexanoate, dimethylaminoethanol, N-acetylglucosamine, L-3-hydroxykynurenine O-sulfate, L valine, L-alanine, octanal, nonanal, decanal, (E,E)-2,4-octadienal, (E,Z)-2,4-octadienal, benzyl acetate, (+)-limonene, (−)-limonene, 6-methyl-5-hepten-2-one (sulcatone), geranylacetone, carbon dioxide, 1-octen-3-ol, L-carvone, L-lactic acid, proprionic acid, butyric acid, valeric acid, oleic acid, palmitic acid, stearic acid, linoleic acid, lauric acid, capric acid, myristic acid, androstenone, 3-methyl indole, 1-docosanol, pentadecanoic acid, squalene, cholesterol, and 2,2-dimethyl-1,3-dioxolane-4-methanol for attracting and/or arresting blood-feeding insects is provided. The blood-feeding insect may be the common bed bug, *Cimex lectularius*, or the tropical bed bug, *C. hemipterus*.

In another aspect the use of histamine, dimethyl disulfide, dimethyl trisulfide, (E)-2-hexenal, (E)-2-octenal and 2-hexanone combined with an effective amount of one or more additional compounds selected from the group consisting of butanal, pentanal, hexanal, benzaldehyde, benzyl alcohol, acetophenone, verbenone, ethyl octanoate, methyl octanoate, pentyl hexanoate, dimethylaminoethanol, N-acetylglucosamine, L-3-hydroxykynurenine O-sulfate, L valine, L-alanine, octanal, nonanal, decanal, (E,E)-2,4-octadienal, (E,Z)-2,4-octadienal, benzyl acetate, (+)-limonene, (−)-limonene, 6-methyl-5-hepten-2-one (sulcatone), geranylacetone, carbon dioxide, 1-octen-3-ol, L-carvone, L-lactic acid, proprionic acid, butyric acid, valeric acid, oleic acid, palmitic acid, stearic acid, linoleic acid, lauric acid, capric acid, myristic acid, androstenone, 3-methyl indole, 1-docosanol, pentadecanoic acid, squalene, cholesterol, and 2,2-dimethyl-1,3-dioxolane-4-methanol for attracting and/or arresting blood-feeding insects is provided. The blood-feeding insect may be the common bed bug, *Cimex lectularius*, or the tropical bed bug, *C. hemipterus*.

In another aspect the use of a composition as described herein for attracting and/or arresting blood-feeding insects is provided. The blood-feeding insect may be the common bed bug, *Cimex lectularius*, or the tropical bed bug, *C. hemipterus*.

The foregoing discussion merely summarizes certain aspects of the inventions and is not intended, nor should it be construed, as limiting the inventions in any way.

BRIEF DESCRIPTION OF THE DRAWING

FIG. 1 illustrates the design of (a) the three-dish, dual-choice olfactometer, and (b) the large Plexiglass arena; the inserts illustrate the bed bug shelter consisting of histamine-impregnated or control filter paper (FP), corrugated cardboard (CC), and an inverted vial lid (IVL) containing volatile pheromone components formulated in mineral oil or mineral oil alone. Drawings are not to scale.

DETAILED DESCRIPTION

Throughout the following description, specific details are set forth in order to provide a more thorough understanding of the invention. Howevergg illustration and are not meant to be limiting.

SUMMARY OF EXAMPLES

A bed bug culture was maintained as a source of exuviae and faeces, and to supply insects for bioassays. Three-dish, dual-choice olfactometers and large arena olfactometers were utilized for bioassays to determine bioactivity of natural sources of pheromone, extracts of said sources, and synthetic chemicals identified from said extracts.

50, 10, 2 or 1 exuviae induced equal attraction and arrestment of $3^{rd}$ to $5^{th}$ instar bed bug nymphs in a two-choice, still-air olfactometer. Moreover, exuviae stored for two months at room temperature retained potency equal to that of exuviae removed recently from bed bug refugia.

A methanol extract bioassayed at a dose of six exuviae equivalents was bioactive and induced arrestment in baited olfactometers, but extracts of exuviae in hexane, ether, dichloromethane and acetonitrile were not effective in inducing arrestment of $3^{rd}$ to $5^{th}$ instar nymphs. The results indicated that this pheromone component had a molecular structure of significant polarity.

Isolation of the pheromone component for structural elucidation was accomplished by extracting exuviae in sequence in organic solvents of increasing polarity (hexane, ether, dichloromethane, acetonitrile, and methanol), so that the final methanol extract contained primarily polar compounds. This methanol extract was then fractionated through silica gel in a glass column by elution with five consecutive rinses (2 ml each) of pentane/ether, with increasing proportions of ether [1) 100:0; 2) 90:10; 3) 80:20; 4) 50:50; 5) 0:100], followed by five consecutive rinses (1 ml each) of dichloromethane/methanol, with increasing proportions of methanol [1) 100:0; 2) 90:10; 3) 80:20; 4) 50:50; 5) 0:100]. Bioassay of the five dichloromethane/methanol fractions showed that only fractions with dichloromethane ($CH_2Cl_2$; 50%) and methanol (MeOH; 50%) as eluents induced an arrestment response in $3^{rd}$ to $5^{th}$ instar bed bug nymphs.

Methanol extracts of bed bug exuviae were subjected to micro-analytical treatments with diazomethane or acetic anhydride in pyridine and then bioassayed. Bioactivity was retained after treatment with diazomethane, but not after treatment with acetic anhydride. These experiments indicated that the key pheromone component had one or more hydroxyl and/or amine groups.

The molecular structure of potential aggregation pheromone components was elucidated by subjecting bioactive silica fractions containing only a few components, to analysis by high performance liquid chromatography-mass spectrometry (HPLC-MS) using acetonitrile as eluent and by one- and two-dimensional nuclear magnetic resonance (NMR) experiments. Results of these analyses revealed several constituents, identified as N-acetylglucosamine, L-3-hydroxykynurene O-sulfate, L-valine, L-alanine, histamine, and dimethylaminoethanol.

A blend of histamine and dimethylaminoethanol arrested bed bugs of both sexes and all developmental stages in three-dish, dual-choice olfactometers, but the role of dimethylaminoethanol was uncertain. N-acetylglucosamine, L-3-hydroxykynurene O-sulfate, L-valine and L-alanine were determined not to be essential pheromone components.

Headspace volatiles from filter paper contaminated by bed bug faeces were analyzed with an Agilent Headspace Analyzer coupled to a Varian 2000 Ion Trap GC-MS fitted with a DB-5 MS GC column (30 m×0.25 μm ID). The analysis revealed a blend of 15 oxygen- or sulphur-containing volatile components, consisting of six aldehydes (butanal, pentanal, hexanal, (E)-2-hexenal, (E)-2-octenal, benzaldehyde), one alcohol (benzyl alcohol), three ketones (2-hexanone, acetophenone, verbenone), three esters (methyl octanoate, ethyl octanoate, pentyl hexanoate) and two sulfides (dimethyl disulfide, dimethyl trisulfide). A synthetic blend of all 15 volatiles arrested bed bugs in three-dish, dual-choice olfactometers at doses of 50, 5.0 and 0.5 μg.

A series of subtraction experiments in which the 15-component synthetic blend was tested alone in three-dish, dual-choice olfactometers or with key groups of components deleted indicated that that one or more of the aldehydes, sulfides, and ketones or alcohol are essential bed bug pheromone components. Further subtraction experiments determined that the essential attractive volatile pheromone components of bed bugs are among the following six compounds: (E)-2-hexenal, (E)-2-octenal, dimethyl disulfide, dimethyl trisulfide, acetophenone and 2-hexanone. A final series of subtraction experiments determined that acetophenone is not essential, and that both sulfides and both aldehydes contribute to the bioactivity of the blend. Therefore, the essential attractive volatile pheromone components were concluded to be (E)-2-hexenal, (E)-2-octenal, dimethyl disulfide, dimethyl trisulfide, and 2-hexanone.

Bioassays in large arena olfactometers with a shelter trap at either end disclosed that the highest captures were found when the traps were baited with the less-volatile histamine and the five-component volatile composition comprised of (E)-2-hexenal, (E)-2-octenal, dimethyl disulfide, dimethyl trisulfide, and 2-hexanone, and that the less volatile and volatile pheromone components acted synergistically The ratio of the histamine to the volatile compounds is in a range of 1:1 to 40:1.

Field experiments in which baited or control shelter traps were deployed in infested premises confirmed the synergistic interaction between the less-volatile histamine and the five-component volatile composition comprised of (E)-2-hexenal, (E)-2-octenal, dimethyl disulfide, dimethyl trisulfide, and 2-hexanone, indicating that all six of the above synthetic pheromone components are essential for operational trapping of bed bugs. Field experiments also demonstrated that shelter traps baited with the above six-component composition were highly effective in disclosing bed bug infestations in premises with very low-level bed bug infestations.

Example 1

Maintaining a Colony of Common Bed Bugs for Production of Exuviae and Use in Bioassays A colony of common bed bugs was kept in an insectary at 22-24° C., ambient relative humidity, and a photoperiod of 10 hours dark to 14 hours light. To collect pheromone for extraction, isolation and identification, the colony was increased from 2,400 to 6,000 bugs and held at the higher level for 18 months.

Approximately 150 bed bugs were kept in each of 40 50-ml jars. Each jar was fitted with a piece of cardboard (2×2 cm) at the bottom and a strip (2×5 cm) of corrugated cardboard diagonally across the jar. The jar was covered with a plastic lid perforated with small holes for ventilation.

Each bed bug was allowed to feed once per month on a human volunteer. At 1,500 bed bugs per week for 30 months, this amounts to 180,000 individual feedings. Jars with bed bugs to be fed were covered with fine mesh and pressed against the volunteer's forearm so that the bed bugs could feed through the mesh. After feeding, nymphal bed bugs moult, shedding their exuvia in the process. Each exuvia of a 5th instar nymph weighs about 0.07 mg. Collecting exuviae of 1,200 5th instar nymphs (20% of the entire colony) per month, resulted in a harvest of 84 mg (1200× 0.07 mg) of exuviae per month for a total of 1,512 mg of exuviae. This was the starting material for extraction, isolation and identification of the aggregation pheromone.

Example 2

General Experimental Design to Investigate the Response of Bed Bugs to Test Stimuli Bioassays were run in dual-choice olfactometers and in large Plexiglass arenas (FIG. 1). Dual-choice olfactometers consisted of two lateral Pyrex® glass Petri dishes, connected to a central dish (all dishes 3×9 cm inner diameter) via a Pyrex® glass tube (2.5 cm long×2 cm inner diameter). The dishes in this olfactometer mimic the natural still-air shelters in which bed bugs spend the day. Prior to the start of bioassays, a disc of paper towelling (9 cm diameter) was placed into each dish and a strip of paper towelling (2.4×0.6 cm) was inserted into the connecting glass tubing to provide traction for walking bed bugs. In addition, a piece of filter paper (2×3 cm; Whatman) was placed into each lateral dish and covered with a piece of cardboard (2×2 cm) as a refuge for bioassay insects.

Treatment and control stimuli were randomly assigned to each lateral dish. Olfactometers were enclosed in opaque plastic bins to prevent light from entering and affecting the insects' response. For each replicate, a single $3^{rd}$ $4^{th}$ or $5^{th}$ instar *C. lectularius* nymph was released into the central chamber of the olfactometer, which was then covered with a glass plate to prevent escape. The single bed bugs in each olfactometer were then allowed to explore all chambers. Each insect was released into an olfactometer at the end of the 14-h photophase allowing it to explore the chambers during 10 h of darkness, and to come to rest in one of the shelters during 10 h of light. After this 20-h period, the insect's position within the olfactometer was recorded. Any insects not found in a lateral chamber were recorded as non-responders. All experimental replicates were run at 24±2° C. and 30-60% RH. Olfactometers were washed with Sparkleen detergent (Fisher Scientific Co, Pittsburgh, Pa., USA), and were oven-dried (Precision, Winchester, Va., USA) between each bioassay.

The large two-chamber Plexiglass arena (180 cm long×12 cm high×13 cm wide) was designed with a central divider (180 cm long×5.5 cm high) to accommodate two pieces of wood (162 cm long×3.8 cm wide×0.8 cm high), each piece for testing the response of a single bed bug to a pheromone-baited shelter or a control shelter (see insert in FIG. 1,*b*) which were randomly assigned to either end of the wood. As some bed bugs succeeded in crossing over the divider, from one chamber to the other, all experimental replicates used only one chamber of each arena. For each replicate, a single bed bug was placed in the center of the wood piece just prior to the end of the 14-h photophase, and its position was scored the next morning after the onset of the photophase.

Example 3

Evidence that Bed Bug Exuviae (Cuticle Shed During Moulting) Induce Arrestment of Foraging Bed Bugs: Effect of Number and Age of Exuviae Tested Experiment 1 tested whether 50 exuviae of $5^{th}$ instar nymphal bed bugs (1 exuvia=0.08 mg) induce arrestment of foraging $5^{th}$ instar nymphs. Given a strong arrestment response of nymphs to 50 exuviae (see Table 1), follow-up Experiments 2-4 tested whether fewer numbers of exuviae would suffice to induce arrestment responses. Experiment 5 explored whether exuviae which were aged at room temperature for 2 months are still effective in inducing arrestment of bed bugs.

In Experiments 1-4, 50, 10, 2 or 1 exuviae were unexpectedly all equally effective in inducing arrestment of bed bugs (Table 1). Surprisingly, in Experiment 5, exuviae after 2 months of storage at room temperature still induced arrestment of bed bugs.

TABLE 1 illustrates the effect of number and age of exuviae on the response of bed bugs in the three-dish, dual-choice olfactometer in Experiments (Exp.) 1-5.

| Exp. no. | No. exuviae | No. arrested in baited chamber | No. arrested in control chamber | No. non-responders |
|---|---|---|---|---|
| 1 | 50 | 12 | 0 | 0 |
| 2 | 10 | 12 | 0 | 0 |
| 3 | 2 | 21 | 1 | 2 |
| 4 | 1 | 10 | 2 | 0 |
| 5 | 2 (stored 1 month) | 12 | 0 | 0 |

Example 4

Efficacy of Organic Solvent to Extract Pheromone from Exuviae

Experiment 6-10 tested the efficacy of different organic solvents (hexane, ether, dichloromethane, acetonitrile, methanol) to extract pheromone from exuviae. Each olfactometer experiment tested 6-exuviae equivalents of extracts, i.e. the amount of material, possibly including pheromone, which could be extracted from a total of six exuviae.

In Experiments 6-9, hexane, ether, dichloromethane and acetonitrile were not effective in extracting pheromone from exuviae and inducing an arrestment response of $3^{rd}$ to $5^{th}$ instar nymphs (Table 2). In Experiment 10, the methanol extract of exuviae induced a strong arrestment response (Table 2), indicating that the bed bug arrestment pheromone component was present in the methanol extract.

TABLE 2 illustrates the effect of organic solvent used for extraction of exuviae on the response of bed bugs in the three-dish, dual-choice olfactometer in Experiments (Exp.) 6-10.

| Exp. no. | Solvent tested | No. arrested in baited chamber | No. arrested in control chamber | No. non-responders |
|---|---|---|---|---|
| 6 | Hexane | 6 | 6 | 0 |
| 7 | Ether | 3 | 5 | 4 |
| 8 | Dichloromethane | 1 | 7 | 3 |
| 9 | Acetonitrile | 4 | 7 | 2 |
| 10 | Methanol | 10 | 1 | 0 |

Example 5

Isolation of the Arrestment Pheromone Component

Presence of the arrestment pheromone component in the methanol extract of exuviae (Table 2, Experiment 10) indicated that it had a molecular structure of significant polarity. To isolate the pheromone component for structural elucidation, exuviae were extracted in sequence in organic solvents of increasing polarity (hexane, ether, dichloromethane, acetonitrile, and methanol). Consequently, the final methanol extract contained primarily polar compounds. This methanol extract was then fractionated through silica gel (0.6 g) in a glass column (14 cm long×0.5 cm inner diameter). After the silica was pre-rinsed with pentane, the methanol extract was applied, allowed to impregnate the silica gel, and then eluted with 5 consecutive rinses (2 ml each) of pentane/ether, with increasing proportions of ether [1) 100:0; 2) 90:10; 3) 80:20; 4) 50:50; 5) 0:100], followed by five consecutive rinses (1 ml each) of dichloromethane/methanol, with increasing proportions of methanol [1) 100:0; 2) 90:10; 3) 80:20; 4) 50:50; 5) 0:100]. The five dichloromethane/methanol fractions were then bioassayed in Experiments 11-15.

In Experiments 11-15 (Table 3), only the silica fraction with 50% methanol as eluent (Experiment 14), induced arrestment of bed bug nymphs.

This protocol for pheromone isolation was repeated in the same or slightly modified form several times. Each time, the responses of bioassay insects to silica fractions indicated that the arrestment pheromone component was present in a fraction eluted with 50% or 100% methanol. These results combined clearly revealed that the arrestment pheromone component is highly polar.

Example 6

Pheromone Identification: Micro-Analytical Treatments of Bio-Active Extract To determine whether the polar arrestment pheromone component has an acid, amine, or alcohol functionality, methanol extracts of exuviae (see Table 2) were subjected to micro-analytical treatments with diazomethane (converts acids to esters) or acetic anhydride in pyridine (converts alcohols to esters) and then bioassayed in Experiments 16 and 17.

In Experiment 16 (Table 4), diazomethane-treated methanol extract of exuviae induced arrestment responses of bed bug nymphs, indicating that the diazomethane treatment did not alter the pheromone molecule and that this pheromone component does not likely have an acid functionality. Conversely, in Experiment 17, acetic anhydride-treated methanol extract of exuviae failed to induce arrestment of bed bug

TABLE 3 illustrates the effect of the solvent system on eluting the bed bug arrestment pheromone component(s) from silica gel. Note that only the test stimulus in Experiment 14, consisting of dichloromethane ($CH_2Cl_2$, 50%) and methanol (MeOH; 50%) as eluents, induced arrestment responses in bed bugs in the three-dish, dual-choice olfactometer.

| Exp. no. | Solvent system | No. arrested in baited chamber | No. arrested in control chamber | No. non-responders |
|---|---|---|---|---|
| 11 | $CH_2Cl_2$ (100%) | 5 | 6 | 1 |
| 12 | $CH_2Cl_2$/MeOH (10%) | 5 | 5 | 2 |
| 13 | $CH_2Cl_2$/MeOH (25%) | 6 | 4 | 2 |
| 14 | $CH_2Cl_2$/MeOH (50%) | 9 | 2 | 1 |
| 15 | MeOH (100%) | 4 | 2 | 6 | nymphs, indicating that the acetic anhydride treatment had altered the molecular structure of the pheromone component and that it had one or more hydroxyl and/or amine groups.

TABLE 4 illustrates the effect of micro-analytical treatments of pheromone extract on the arrestment response of bed bug nymphs in Experiments 16 and 17. Note that the acetic anhydride treatment of methanol extract of exuviae altered the molecular structure of the pheromone component and thus failed to induce a significant arrestment response of bed bug nymphs in the three-dish, dual-choice olfactometer.

| Exp. no. | Treatment | No. arrested in baited chamber | No. arrested in control chamber | No. non-responders |
|---|---|---|---|---|
| 16 | Diazomethane-treated pheromone extract | 9 | 0 | 3 |
| 17 | Acetic anhydrite-treated pheromone extract | 3 | 6 | 3 |

Example 7

Pheromone Identification: Nuclear Magnetic Resonance Spectroscopy (NMR) of Bioactive Extract To elucidate the molecular structure of the arrestment pheromone component, the $^1$H NMR spectra of several methanol extracts of exuviae and feces were examined and compared. Analyses of the $^1$H NMR spectra revealed several common components that were identified as L-valine, L-alanine, N-acetylglucosamine, histamine, dimethylaminoethanol, and 3-hydroxykynurenine O-sulfate.

Valine, alanine, N-acetylglucosamine, histamine, and dimethylaminoethanol were identified by comparison of the observed $^1$H and $^{13}$C NMR and mass spectrometric data with those reported previously for these compounds. In addition, authentic samples of L-valine, N-acetylglucosamine, histamine, and dimethylaminoethanol were purchased from commercial vendors and added to a crude methanol extract in separate experiments. In each of these additional experiments, the resonances observed in the $^1$H NMR spectra recorded on the crude methanol extract and assigned to a specific component (i.e., L-valine, L-alanine, N-acetylglucosamine, histamine, and dimethylaminoethanol) were enhanced by the addition of an authentic sample of that component, confirming the identity and occurrence of these chemicals in the crude methanol extracts.

The structure of 3-hydroxykynurenine O-sulfate was proposed following comparison of specific resonances observed in the $^1$H NMR spectra recorded on the crude methanol extracts to those reported previously for 3-hydroxykynurenine O-sulfate. Additionally, an authentic sample of 3-hydroxykynurenine O-sulfate was prepared from 3-hydroxykynurenine following protection of the carboxylic acid as a methyl ester and the amine function as a carboxybenzyl amide. Sulfation of the free alcohol using Me$_3$N—SO$_3$, followed by removal of the carboxybenzyl protecting group by hydrogenolysis and hydrolysis of the methyl ester provided an authentic sample of 3-hydroxykynurenine O-sulfate. The 1D and 2D NMR spectra ($^1$H, COSY, HMQC, HMBC) recorded on the synthetic sample of 3-hydroxykynurenine O-sulfate were in complete agreement with the natural material present in the crude methanol extract.

Table 5 summarizes the relative amounts of each of these components in each of five individual methanol extracts, and Table 6 shows the biological activity of each extract in Experiments 18-22. Note that the highest response levels (Experiments 18-20) were achieved with the three extracts in which histamine and dimethaminoethanol were both present in appreciable amounts.

TABLE 5 illustrates the relative amount in mg of each of the common components found in the methanol extracts of bed bug exuviae and feces.

| | Extract No. | | | | |
|---|---|---|---|---|---|
| Compound | 1 | 2 | 3 | 4 | 5 |
| L-Valine | 0.14 | 0.07 | 0.0 | 0.0 | 0.06 |
| L-Alanine | 0.0 | 0.0 | 0.0 | 0.0 | 0.0 |
| N-Acetylglucosamine | 0.0 | 0.0 | 0.0 | 0.25 | 0.0 |
| 3-Hydroxykynurenine O-sulfate | 3.7 | 2.5 | 3.2 | 0.48 | 2.1 |
| Histamine | 4.7 | 1.9 | 8.2 | 0.0 | 0.0 |
| Dimethylaminoethanol | 3.0 | 0.7 | 0.9 | 0.0 | 0.0 |

TABLE 6 illustrates the response of bed bugs in bioassays in the three-dish, dual-choice olfactometer of the five extracts analyzed for constituent components in Table 5.

| Extract No. | Experiment No. | No. arrested in baited chamber | No. arrested in control chamber | No. non-responders |
|---|---|---|---|---|
| 1 | 18 | 10 | 1 | 1 |
| 2 | 19 | 10 | 1 | 1 |
| 3 | 20 | 10 | 1 | 1 |
| 4 | 21 | 9 | 2 | 2 |
| 5 | 22 | 7 | 4 | 2 |

Example 8

Histamine: an Essential Pheromone Component of Bed Bugs

With the highest response levels of bed bugs achieved with extracts in which histamine and dimethylaminoethanol were both present (Tables 5, 6), follow-up experiments were designed to test the response of bed bugs to authentic standards. In Experiments 23-25, increasing doses of dimethylaminoethanol and histamine at a ratio of 1:1 improved the bed bugs' arrestment response (Table 7). Experiments 26-28 then tested dimethylaminoethanol (20 µg) and histamine (20 µg), with histamine presented as a base, salt or base and salt. The results reveal that histamine only as a base elicits the bed bugs' arrestment response (Table 7). Consequently, all further experiments deployed histamine as a base.

histamine alone at 200 µg each and in binary combination at a ratio of 20 µg:200 µg. The data reveal that histamine, but not dimethylaminoethanol, is bioactive on its own, and at the dose tested is as effective as the 2-component blend in arresting bedbugs.

Experiments 23-37 do not define a clear role for dimethylaminoethanol. On the one hand, when dimethylaminoethanol and histamine were offered at a ratio of 2 µg:20 µg in Experiment 32, there was no preferential selection of the baited chamber. However, when the dose of dimethylaminoethanol was raised to 20 µg, equal to that of histamine, in Experiments 24 and 29, a preference for the baited chamber appeared. On the other hand, unlike histamine in Experiment 37, dimethaminoethanol alone in Experiment 36 was inactive. Moreover, increasing the dose of dimethylaminoethanol 10-fold in Experiments 32, while the dose of histamine was held constant, did not result in an increased response.

TABLE 7 illustrates the response in the three-dish, dual-choice olfactometer of bed bug nymphs in Experiments 23-37 to 1-or 2-component baits of dimethylaminoethanol (D) and histamine (H); numbers in parentheses indicate amounts in micrograms.

| Exp. no. | Bait* | No. insects in bait chamber | No. insects in control chamber | No. insects not responding |
|---|---|---|---|---|
| 23 | D (2):H (2) | 4 | 4 | 4 |
| 24 | D (20):H (20) | 8 | 2 | 2 |
| 25 | D (200):H (200) | 12 | 0 | 0 |
| 26 | D (20):H (20) (base) | 10 | 1 | 1 |
| 27 | D (20):H (20) (salt) | 5 | 4 | 3 |
| 28 | D (20):H (20) (base/salt) | 9 | 1 | 2 |
| 29 | D (20):H (20) | 15 | 5 | 4 |
| 30 | D (200):H (20) | 13 | 4 | 7 |
| 31 | D (20):H (200) | 20 | 2 | 2 |
| 32 | D (2):H (20) | 6 | 5 | 2 |
| 33 | D (20):H (200) | 10 | 2 | 0 |
| 34 | D (200):H (2000) | 10 | 1 | 1 |
| 35 | D (20):H (200) | 33 | 11 | 4 |
| 36 | D (200):H (0) | 14 | 15 | 19 |
| 37 | D (0):H (200) | 35 | 10 | 3 |

Experiments 29-31 tested whether a 10-fold (from 20 µg to 200 µg) increase of dimethylaminoethanol or of histamine improves lure effectiveness. The results indicate that the 10-fold increase of histamine enhances the bed bugs' arrestment response (Table 7). Drawing on results of Experiments 29-31, Experiments 32-34 tested dimethylaminoethanol and histamine at a 1:10 ratio at doses of 2 µg:20 µg, 20 µg:200 µg, and 200 µg:2000 µg. The results show that the two highest doses are very effective in eliciting an arrestment response by bed bugs (Table 7). To determine the effect of dimethylaminoethanol or histamine in the 2-component blend, Experiments 35-37 tested dimethylaminoethanol and Example 9

Effect of Additional Components (L-valine, L-alanine, N-acetylglucosamine, 3-hydroxy-kynurenine O-sulfate) on the Blend of Histamine and Dimethylaminoethanol With other constituents being present in methanol extracts of bed bug exuviae or feces (Table 5), Experiments 38 and 39, and 40 and 41, tested whether the 2-component blend of dimethylaminoethanol and histamine (20 µg:200 µg) would become more effective through the addition of L-valine, L-alanine and N-acetylglucosamine (Experiment 39), or the addition of 3-hydroxy-kynurenine O-sulfate (Experiment 41). The data reveal that the effectiveness in arresting bed bugs of the 2-component blend of dimethylaminoethanol and histamine (Experiments 38 and 40) could not be improved by the addition of other components (Table 8).

TABLE 8 illustrates the response of bed bug nymphs in the three-dish, dual-choice olfactometer in Experiments 38-42 to the 2-component bait of dimethylaminoethanol (D) and histamine (H) or the same bait with additional components [L-valine (V), L-alanine (A), N-acetylglucosamine (N-ac), 3-hydroxykynurenine O-sulfate (3-Hyd)] identified in the methanol extracts of bed bug exuviae and feces; numbers in parentheses indicate amounts in micrograms.

| Exp. no. | Bait* | No. insects in bait chamber | No. insects in control chamber | No. insects in not responding |
| --- | --- | --- | --- | --- |
| 38 | D (20):H (200) | 13 | 3 | 2 |
| 39 | D (20):H (200): V (20):A (20):N-ac (20) | 12 | 4 | 2 |
| 40 | D (20):H (200) | 10 | 2 | 0 |
| 41 | D (20):H (200):3-Hyd (200) | 9 | 3 | 0 |

Example 10

Comparative Response of Bed Bug Nymphs, Adult Males and Adult Females to the Blend of Dimethylaminoethanol and Histamine To determine whether the 2-component blend of dimethylaminoethanol and histamine elicits an arrestment response of immature and mature stages of bed bugs, Experiments 42-44 tested dimethylaminoethanol and histamine (20 µg:200 µg) for the response of bed bug nymphs, adult males and adult females. The data reveal that the 2-component blend is equally effective in inducing an arrestment response of nymphs, and adult males and females (Table 9).

TABLE 9 illustrates the response in the three-dish, dual-choice olfactometer of bed bug nymphs, adult males or adult females to the 2-component blend of dimethylaminoethanol (D) and histamine (H); numbers in parentheses indicate amounts in micrograms.

| Exp. no. | Bait* | Insects tested | No. insects in bait chamber | No. insects in control chamber | No. insects not responding |
| --- | --- | --- | --- | --- | --- |
| 42 | D (20):H (200) | nymphs | 18 | 4 | 2 |
| 43 | D (20):H (200) | males | 19 | 1 | 4 |
| 44 | D (20):H (200) | females | 19 | 2 | 3 |

Example 11

Identification of Candidate Volatile Pheromone Components in Bed Bug Feces

With evidence that dimethylaminoethanol has only a limited pheromonal role (Table 7), and with histamine being less volatile and thus likely serving as an arrestant rather than an attractant, the search was continued for attractive volatile pheromone components. The focus was also shifted to bed bug faeces which are present in natural bed bug shelters along with exuviae.

Pieces of filter paper (5×10 cm) exposed to the feces of approximately 300 bed bugs over a period of four weeks were cut into small sections of 0.75×0.5 cm each which were analyzed with an Agilent Headspace Analyzer coupled to a Varian 2000 Ion Trap GC-MS fitted with a DB-5 MS GC column (30 m×0.25 µm ID). After placing the feces-stained paper into a 20-ml vial, it was sealed with a crimped cap with a 20-mm OD white silicon septum and heated to 90° C. for 5 min. The airborne headspace volatiles were withdrawn with an automated syringe and subjected to coupled gas GC-MS analysis, using the following temperature program: 50° C. for 5 min, then 10° C. per min to 280° C. The analysis revealed a complex blend of 15 oxygen- or sulphur-containing volatile components, consisting of six aldehydes (butanal, pentanal, hexanal, (E)-2-hexenal, (E)-2-octenal, benzaldehyde), one alcohol (benzyl alcohol), three ketones (2-hexanone, acetophenone, verbenone), three esters (methyl octanoate, ethyl octanoate, pentyl hexanoate) and two sulfides (dimethyl disulfide, dimethyl trisulfide). All of these 15 compounds were considered candidate pheromone components to be tested for attraction of bed bugs in dual-choice olfactometer bioassays (see EXAMPLE 2; FIG. 1).

Example 12

Response of Adult Male Bed Bugs to Synthetic Blends at Three Doses of Bed Bug Feces Volatiles To determine whether a blend of the 15 bed bug feces volatiles that were identified in bed bug feces (see EXAMPLE 11) attracts bed bugs and thus contains one or more bed bug pheromone components, the synthetic blend (SB) was tested at a medium dose (50 µg; Experiment 45), a low dose (5 µg; Experiment 46), and a very low dose (0.5 µg; Experiment 47) for the response of bed bugs in three-dish, dual-choice olfactometers (see EXAMPLE 2, FIG. 1). At each dose tested, all components were formulated in equal amounts in mineral oil which was pipetted into the inverted lid of a 4-ml vial. The vial was then placed on top of the corrugated cardboard shelter (see FIG. 1) in the randomly assigned treatment dish of the olfactometer (see EXAMPLE 2). The control stimulus consisted of the same type of lid on the corrugated cardboard of the control dish of the olfactometer containing mineral oil without synthetic test chemicals.

In Experiments 45-47, synthetic blends of bed bug feces volatiles at a medium, low and very low dose, all attracted more bed bug males than did control stimuli, indicating that the blend contained one or more bed bug pheromone components. The medium dose was selected for use in further experiments.

groups of related organic chemicals, i.e. esters (methyl octanoate, ethyl octanoate, pentyl hexanoate; Experiment 49), aldehydes (butanal, pentanal, hexanal, E2-hexenal, E2-octenal, benzyl aldehyde; Experiment 50), sulfides (dimethyl disulfide, dimethyl trisulfide; Experiment 51), and ketones/alcohol (2-hexanone, acetophenone, verbenone, benzyl alcohol; Experiment 52). All SBs were formulated and bioassayed as described in EXAMPLE 11.

In Experiment 48 (Table 11), the 15-component SB strongly attracted adult male bed bugs, confirming that this

TABLE 10 illustrates the response of bed bug males in the three-dish, dual-choice olfactometer to a synthetic blend (SB) of 15 bed bug feces volatiles (EXAMPLE 11) tested at a medium dose (50 μg), low dose (5 μg), and very low dose (0.5 μg); at each dose, all components were formulated in equal amounts in mineral oil.

| Exp. no. | Bait* | No. insects in bait chamber | No. insects in control chamber | No. insects in not responding |
|---|---|---|---|---|
| 45 | SB (50 μg) | 29 | 7 | 0 |
| 46 | SB (5.0 μg) | 21 | 12 | 3 |
| 47 | SB (0.5 μg) | 24 | 10 | 2 |

Example 13

Determination of Pheromone Components in Synthetic Blend of Bed Bug Feces Volatiles To determine the essential component(s) in the 15-component synthetic blend (SB) of bed bug feces volatiles that attract bed bugs (EXAMPLE 12; Table 10), Experiments 48-52 compared their responses to the complete SB of all 15 components (Experiment 48), with those to SBs that lacked SB contained one or more bed bug pheromone components. Similarly, in Experiment 49 (Table 11), the SB lacking esters strongly attracted adult male bed bugs, indicating that esters are not an essential part of the bed bug pheromone blend. Conversely, shelters baited with SBs lacking aldehydes (Experiment 50), sulfides (Experiment 51), or ketones and alcohol (Experiment 52), all failed to capture significantly more adult male bed bugs than control shelters, indicating that one or more of the aldehydes, sulfides, and ketones or alcohol are essential bed bug pheromone components.

TABLE 11 illustrates the response of adult male bed bugs in the three-dish, dual-choice olfactometer to: a 15-component synthetic blend (SB) comprising 6 aldehydes (butanal, pentanal, hexanal, (E)-2-hexenal, (E)-2-octenal, benzyl aldehyde), one alcohol (benzyl alcohol), 3 ketones (2-hexanone, acetophenone, verbenone), 3 esters (ethyl octanoate, methyl octanoate, pentyl hexanoate), and 2 sulfides (dimethyl disulfide and dimethyl trisulfide) (Exp. 48, 53 and 57); said 15-component blend minus said 3 esters, 6 aldehydes, 2 sulfides, or one alcohol and 3 ketones (Exp. 49-52, respectively); said 15-component blend minus benzaldehyde and benzyl alcohol (Exp. 54), verbenone (Exp. 55), or (E)-2-hexenal and (E)-2-octanal (Exp. 56); a 6-component synthetic blend (6-Comp. SB) comprising (E)-2-hexenal, (E)-2-octenal, 2-hexanone, acetophenone, dimethyl disulfide and dimethyl trisulfide (Exp. 58, 59, 62 and 65); and said 6-component synthetic blend minus acetophenone (Exp. 60), 2-hexanone (Exp. 61), dimethyl disulfide (Exp. 63), dimethyl trisulfide (Exp. 64), (E)-2-hexenal (Exp. 66), or (E)-2-octenal (Exp. 67). Experiments in each of the following groups were run concurrently: 48-52, 53-56, 57-58, 59-61, 62-64, and 65-67. All blends were tested at a dose of 50 μg.

| Exp. no. | Bait | No. insects in bait chamber | No. insects in control chamber | No. insects in not responding |
|---|---|---|---|---|
| 48 | SB | 18 | 4 | 2 |
| 49 | SB minus esters | 16 | 4 | 4 |
| 50 | SB minus aldehydes | 11 | 7 | 6 |
| 51 | SB minus sulfides | 10 | 7 | 7 |
| 52 | SB minus ketones and alcohol | 11 | 10 | 3 |
| 53 | SB | 12 | 6 | 2 |
| 54 | SB minus benzaldehyde and benzyl alcohol | 13 | 6 | 1 |
| 55 | SB minus verbenone | 14 | 6 | 0 |
| 56 | SB minus (E)-2-hexenal and (E)-2-octanal | 9 | 9 | 2 |
| 57 | SB | 15 | 5 | 0 |
| 58 | 6-Comp. SB | 14 | 2 | 1 |
| 59 | 6-Comp. SB | 20 | 3 | 1 |
| 60 | 6-Comp. SB minus acetophenone | 20 | 3 | 1 |
| 61 | 6-Comp. SB minus 2-hexanone | 13 | 9 | 1 |

TABLE 11-continued illustrates the response of adult male bed bugs in the three-dish, dual-choice olfactometer to: a 15-component synthetic blend (SB) comprising 6 aldehydes (butanal, pentanal, hexanal, (E)-2-hexenal, (E)-2-octenal, benzyl aldehyde), one alcohol (benzyl alcohol), 3 ketones (2-hexanone, acetophenone, verbenone), 3 esters (ethyl octanoate, methyl octanoate, pentyl hexanoate), and 2 sulfides (dimethyl disulfide and dimethyl trisulfide) (Exp. 48, 53 and 57); said 15-component blend minus said 3 esters, 6 aldehydes, 2 sulfides, or one alcohol and 3 ketones (Exp. 49-52, respectively); said 15-component blend minus benzaldehyde and benzyl alcohol (Exp. 54), verbenone (Exp. 55), or (E)-2-hexenal and (E)-2-octanal (Exp. 56); a 6-component synthetic blend (6-Comp. SB) comprising (E)-2-hexenal, (E)-2-octenal, 2-hexanone, acetophenone, dimethyl disulfide and dimethyl trisulfide (Exp. 58, 59, 62 and 65); and said 6-component synthetic blend minus acetophenone (Exp. 60), 2-hexanone (Exp. 61), dimethyl disulfide (Exp. 63), dimethyl trisulfide (Exp. 64), (E)-2-hexenal (Exp. 66), or (E)-2-octenal (Exp. 67). Experiments in each of the following groups were run concurrently: 48-52, 53-56, 57-58, 59-61, 62-64, and 65-67. All blends were tested at a dose of 50 μg.

| Exp. no. | Bait | No. insects in bait chamber | No. insects in control chamber | No. insects in not responding |
|---|---|---|---|---|
| 62 | 6-Comp. SB | 20 | 3 | 1 |
| 63 | 6-Comp. SB minus dimethyl trisulfide | 18 | 6 | 0 |
| 64 | 6-Comp. SB minus dimethyl disulfide | 17 | 6 | 1 |
| 65 | 6-Comp. SB | 19 | 5 | 0 |
| 66 | 6-Comp. SB minus (E)-2-hexenal | 18 | 5 | 1 |
| 67 | 6-Comp. SB minus (E)-2-hexenal | 15 | 8 | 1 |

To narrow down the specific aldehyde(s), ketone(s) or sulphide(s) that constitute bed bug pheromone components, follow-up and concurrently-run experiments again tested the complete SB (Experiment 53), and SBs lacking both benzyl aldehyde and benzyl alcohol (Experiment 54), verbenone (Experiment 55), or both (E)-2-hexenal and (E)-2-octenal (Experiment 56).

In Experiment 53 (Table 11), shelters baited with the 15-component SB captured twice as many adult bed bug males as did control shelters. Similar data were obtained with SBs lacking both benzyl aldehyde and benzyl alcohol (Experiment 54) or lacking verbenone (Experiment 55), indicating that none of these three compounds is an essential bed bug pheromone component. Conversely, shelters baited with the SB lacking both (E)-2-hexenal and (E)-2-octenal (Experiment 56) failed to capture more adult male bed bugs that did control shelters, indicating that one or both of these two aldehydes are bed bug pheromone components.

The combined data of Experiments 48-56 indicated that the essential attractive pheromone components of bed bugs are among the following six compounds: (E)-2-hexenal, (E)-2-octenal, dimethyl disulfide, dimethyl trisulfide, acetophenone and 2-hexanone. To ascertain whether this 6-component synthetic blend (6-Comp. SB) was as effective as the 15-comp. SB in attracting bed bugs, Experiments 57 and 58 tested SB and 6-Comp. SB versus control stimuli.

In Experiment 57 (Table 11), the 15-Comp. SB as expected attracted significantly more adult male bed bugs than did the control stimulus. In Experiment 58, the 6-Comp. SB attracted significantly more adult male bed bugs than did the control stimulus. Because SB and 6-Comp. SB appeared equally capable of attracting bed bugs, it was concluded that all essential pheromone components are present in the 6-Comp. SB.

To determine the essential ketone(s) in the 6-Comp. SB, follow-up and concurrently-run experiments compared responses to the 6-Comp. SB (Experiment 59), the 6-Comp. SB lacking acetophenone (Experiment 60) and the 6-Comp. SB lacking 2-hexanone (Experiment 61).

In Experiment 59 (Table 11), the 6-Comp. SB attracted significantly more adult male bed bugs than did the control stimulus. Similarly, in Experiment 60 the 6-Comp. SB lacking acetophenone attracted significantly more adult male bed bugs than did the control stimulus, indicating that acetophenone is not an essential bed bug pheromone component. Conversely, in Experiment 61, the 6-Comp. SB lacking 2-hexanone failed to attract significant numbers of adult male bed bugs, indicating that 2-hexanone is a key bed bug pheromone component.

To determine the key sulfide(s) in the 6-Comp. SB, the next three follow-up and concurrently-run experiments compared responses to the 6-Comp. SB (Experiment 62), the 6-Comp. SB lacking dimethyl disulfide (Experiment 63), and the 6-Comp. SB lacking dimethyl trisulfide (Experiment 64).

In Experiment 62, the 6-Comp. SB attracted significantly more adult male bed bugs than did the control stimulus. Similarly, the two 6-Comp. SBs lacking either dimethyl disulfide (Experiment 63) or dimethyl trisulfide (Experiment 64) were still more effective than control stimuli in attracting adult male bed bugs. However, the 6-Comp. SB with both of these sulfides (Experiment 62) appeared relatively more attractive than SBs containing just one sulfide (Experiments 63 and 64), suggesting that both of these sulfides are important pheromone components and should be included in operational lures.

To determine the key aldehyde(s) of the 6-Comp. SB, the next three follow-up and concurrently run experiments compared responses to the 6-Comp. SB (Experiment 65), the 6-Comp. SB lacking (E)-2-hexenal (Experiment 66), and the 6-Comp. SB lacking (E)-2-octenal (Experiment 67).

In Experiment 65 (Table 11), the 6-Comp. SB attracted significantly more adult male bed bugs than did the control stimulus. Similarly, in Experiment 66 the 6-Comp. SB lacking (E)-2-hexenal attracted significantly more adult male bed bugs than did the control stimulus. Conversely, in Experiment 67 the 6-Comp. SB lacking (E)-2-octenal attracted barely twice as many adult male bed bugs than did the control stimulus. The data in combination reveal that (E)-2-octenal is a relatively more important pheromone component than (E)-2-hexenal. Nonetheless, both aldehydes are to be included in a commercial bed bug pheromone lure for optimal attractiveness.

Example 14

Response of Bed Bugs to Synthetic Pheromone Lures in Large Bioassay Arenas

Experiments 68-75 were carried out to ascertain whether bed bugs respond to synthetic pheromone not only in small olfactometers (EXAMPLE 2; FIG. 1; Tables 7-11) but also in large bioassay arenas. Experiments 68-75 also investigated the effect of the volatile pheromone components (VPCs) (E)-2-hexenal, (E)-2-octenal, dimethyl disulfide, dimethyl trisulfide and 2-hexanone, and the effect of the less-volatile pheromone component histamine (H), on attraction and arrestment of bed bugs. Treatment stimuli consisted of filter paper (4×2.2 cm) impregnated with H (2,000 µg) and covered with a piece of corrugated cardboard shelter (3×2.2 cm), and of VPCs formulated at a high dose (500 µg; Experiments 68-74) or a medium dose (50 µg; Experiment 75) in mineral oil (0.5 ml) and pipetted into the inverted lid of a 20-ml scintillation vial resting on top of the shelter (FIG. 1). Control stimuli were of identical design but the filter paper contained no H, and the mineral oil contained no VPCs.

Specifically, Experiment 68 tested the complete synthetic pheromone blend consisting of VPCs and H versus a control stimulus, whereas concurrently-run Experiment 69 tested a partial pheromone blend consisting of only VPCs versus a control stimulus.

In Experiment 68 (Table 12), 15 of the 16 male bed bugs that were tested individually responded to the complete pheromone blend, indicating that the complete blend contained all essential bed bug pheromone components. In Experiment 69, in contrast, only 6 of the 16 male bed bugs tested responded to the partial pheromone blend consisting of VPCs without histamine, confirming that histamine is an essential bed bug pheromone component (see also Tables 7-9), and that H serves the role of arresting bed bugs at a shelter once they have been attracted to it by the VPCs.

To determine the effect of VPCs in the pheromone blend, we then tested concurrently histamine alone versus a blank control (Experiment 70), and the complete pheromone blend of VPCs and histamine versus a blank control (Experiment 71).

In Experiment 70 (Table 12), 12 bed bugs responded to the shelter with histamine-impregnated filter paper, whereas only one bed bug responded to the shelter with blank filter paper, indicating again that bed bugs are arrested in the presence of histamine. In Experiment 71, 17 bed bugs responded to the shelter associated with the complete pheromone blend of VPCs and histamine, and only one bed bug responded to the control shelter, suggesting that the complete pheromone blend was possibly more effective than the partial blend (tested in Experiment 70) in attracting or arresting bed bugs.

To compare further the relative importance of histamine and VPCs as bed bug pheromone components, we tested concurrently the response of bed bugs to shelters baited with histamine or VPCs (Experiment 72), and the complete pheromone blend of VPCs and histamine versus a blank control (Experiment 73).

In Experiment 72 (Table 12), 14 bed bugs responded to shelter baited with histamine and two bed bugs responded to shelter baited with VPCs, indicating that histamine had a stronger effect on the bed bugs' decision which shelter to select. In Experiment 73, 15 bed bugs responded to shelter baited with the complete pheromone blend (VPCs+histamine) and only one bed bug responded to unbaited control shelter, confirming the superior effect of the complete bed bug pheromone blend.

With histamine strongly arresting bed bugs at a shelter (see Experiments 70 & 72 in Table 12), we then explored whether the effect of histamine could be enhanced by adding VPCs to histamine. Accordingly, we tested the response of bed bugs to histamine or to histamine plus VPCs, both at high dose of VPCs (500 µg; Experiment 75) and at a medium dose of VPCs (50 µg; Experiment 74).

In Experiments 74 and 75, the complete pheromone blend of histamine plus VPCs at a high dose and at a medium dose attracted and arrested significantly more bed bugs than did

TABLE 12 illustrates the response of adult male bed bugs to complete or partial synthetic pheromone blends comprising the volatile pheromone components (VPCs) (E)-2-hexenal, (E)-2-octenal, dimethyl disulfide, dimethyl trisulfide and 2-hexanone, and/or the less-volatile pheromone component histamine (H). VPCs in experiments 68-74 were tested at 500 µg and in experiment 75 at 50 µg. Histamine was tested at 2,000 µg. Experiments 68-69, 70-71, 72-73, and 74-75 were run concurrently.

| Exp. no. | Shelter 1 | Shelter 2 | No. insects in shelter 1 | No. insects in shelter 2 | No. insects not responding |
|---|---|---|---|---|---|
| 68 | VPC + H | unbaited | 15 | 0 | 1 |
| 69 | VPC | unbaited | 6 | 3 | 7 |
| 70 | H | unbaited | 12 | 1 | 5 |
| 71 | VPC + H | unbaited | 17 | 1 | 3 |
| 72 | VPC | H | 2 | 14 | 4 |
| 73 | VPC + H | unbaited | 15 | 1 | 4 |
| 74 | VPC + H | H | 17 | 5 | 3 |
| 75 | VPC + H | H | 10 | 0 | 6 | histamine alone, clearly revealing a synergistic effect between VPCs (attracting bed bugs) and histamine (arresting bed bugs).

Example 14

Response of Bed Bugs to Synthetic Pheromone Lures in a Heavily Infested Residential Apartment To determine whether bed bugs responded to synthetic pheromone lures not only in large arena laboratory bioassays but also in infested premises (residential apartments), we placed pheromone-baited shelter traps (see FIG. 1) in apartments with known or suspected bed bug infestations. The shelter was identical to that described in EXAMPLE 13 except that the histamine-impregnated filter paper or control filter paper was glued to the corrugated cardboard shelter for ease of shelter placements. Based on 24-hour trapping results in multiple apartments, we selected a single, heavily infested apartment (hereafter referred to as Room 106) for further testing of synthetic bed bug pheromone lures.

To obtain field evidence for synergistic interaction between the VPCs and histamine in synthetic pheromone lures (see laboratory Experiments 74 & 75 in Table 12), two consecutive sets of two experiments were run (Set 1: Experiments 76 and 77: Set 2: Experiments 78 and 79) in Room 106. Replicates (n=15-20) of each experiment consisted of paired shelters placed against a wall or furniture, with approximately 30-cm spacing between paired shelters and ≥1 m spacing between shelter pairs. For each shelter pair within each experiment, pheromone and control treatments were randomly assigned, and placement of replicates was alternated between the two experiments of Set 1 and Set 2. Because not more than 10 shelter pairs could be accommodated in Room 106 at any time, experimental data were collected over several consecutive 24-h periods. Every morning at 9:00, shelters were collected from Room 106 and immediately placed into separate labelled zipper lock bags which were then put on dry ice to kill the bed bugs that had entered a shelter. Bed bugs in each shelter were later counted in the laboratory under a microscope, noting their developmental stage ($1^{st}$, $2^{nd}$ $3^{rd}$, $4^{th}$, instar, adult), sex (male, female), and evidence (or not) for blood feeding prior to entry into a shelter. Immediately following the removal of bed bug shelters from Room 106 each morning, new pre-prepared shelters were pheromone-baited (treatment) or not (control) and their position within shelter pairs randomly assigned (see above), again alternating placement of shelter pairs between Experiments 76 and 77 (Set 1) and between Experiments 78 and 79 (Set 2).

To determine the effectiveness of synthetic pheromone lures in the presence or absence of the volatile pheromone components (VPCs) (E)-2-hexenal, (E)-2-octenal, dimethyl disulfide, dimethyl trisulfide, 2-hexanone (that we predicted would attract bed bugs to a shelter), and the less-volatile component histamine (that we predicted would retain bed bugs at a shelter), we compared the response of bed bugs to complete and partial synthetic pheromone lures in Experiments 76 and 77, and in Experiments 78 and 79, with experiments in each set run concurrently.

In Experiment 76 we tested shelters baited with the complete synthetic pheromone lure (VPCs+histamine) versus unbaited shelters, and in Experiment 77 we tested shelters baited with VPCs only versus unbaited shelters. Analogously, in Experiment 78 we tested shelters baited with the complete synthetic pheromone lure (VPCs+histamine) versus unbaited shelters, and in Experiment 79 we tested shelters baited with histamine only versus unbaited shelters.

In Experiment 76 (Table 13), shelters baited with the complete synthetic pheromone blend attracted and retained, on average, 21.4 bed bugs compared to 4.8 bed bugs, on average, in control shelters. These data indicate that the complete synthetic pheromone lure had a significant effect on attracting and retaining bed bugs. Conversely, in Experiment 77 shelters baited with only the VPCs attracted and retained, on average, only 10.3 bed bugs compared to 4.7 bed bugs, on average, in control shelters.

TABLE 13 illustrates the response of nymphal and adult bed bugs in a residential apartment to corrugated cardboard shelter traps (see FIG. 1) baited with the complete synthetic pheromone blend consisting of the volatile pheromone components (VPCs) (E)-2-hexenal, (E)-2-octenal, dimethyl disulfide, dimethyl trisulfide and 2-hexanone (total amount 500 µg) and of the less-volatile pheromone component histamine (H) (2,000 µg), or baited with partial pheromone blends lacking either the VPCs or histamine. The pheromone-baited shelter and unbaited control shelter in each experimental replicate were separated by at least 30 cm, with ≥1-m spacing between replicates. There was alternate placement of replicates of concurrently run Experiments 76 and 77 (20 replicates each), and of concurrently run Experiments 78 and 79 (15 replicates each).

| Exp. no. | Bait* | Mean ± SE number insects in baited shelter | Mean (± SE) number insects in control shelter |
|---|---|---|---|
| 76 | VPCs + H | 21.4 ± 5.93 | 4.8 ± 1.82 |
| 77 | VPCs | 10.3 ± 3.45 | 4.7 ± 1.73 |
| 78 | VPCs + H | 24.86 ± 6.84 | 3.73 ± 1.43 |
| 79 | H | 6.06 ± 1.28 | 4.53 ± 1.8 |

The combined data from Experiments 76 and 77 reveal that the complete synthetic pheromone lure is superior to a partial pheromone lure (lacking histamine) in attracting and retaining bed bugs.

In Experiment 78 (Table 13), shelters baited with the complete synthetic pheromone blend attracted and retained, on average, 24.86 bed bugs compared to 3.73 bed bugs, on average, in control shelters. These data indicate again that the complete synthetic pheromone lure had a significant effect on attracting and retaining bed bugs. Conversely, in Experiment 79 shelters baited with a partial pheromone blend containing only histamine attracted and retained, on average, only 6.06 bed bugs compared to 4.53 bed bugs, on average, in control shelters.

The combined data from Experiments 76-79 reveal that the complete synthetic pheromone blend is most effective in attracting and retaining bed bugs. The surprising superior performance of the complete synthetic pheromone blend is due to the combined effects of two types of pheromone components, the volatile components (VPCs) that attract bed bugs to a shelter, and the less-volatile pheromone component histamine that arrests bed bugs in a shelter after they have been attracted to it.

Pheromone-baited shelters contained all nymphal instars (fed and non-fed) as well as adult males and females (fed and non-fed), clearly indicating that the complete synthetic pheromone attracts and retains bed bugs irrespective of their developmental stage, gender or physiological condition.

Example 15

Response of Bed Bugs to Synthetic Pheromone Lures in Residential Apartments with Light Bed Bug Infestations To ascertain whether bed bugs responded to the complete synthetic pheromone not only in residential apartments heavily infested with bed bugs (see EXAMPLE 14; Table 13) but also in apartments with very light bed bug infestations, trapping was done in eight residential apartments in three separate buildings where tenants suspected they had bed bugs according to reports of a pest management professional. In each of these apartments, bedding, mattresses and other furniture were carefully inspected for the presence of live bed bugs and for evidence of bed bug activity such as fecal spots on bed sheets. In Experiment 80, 1-5 pairs of bed bug shelter traps (see FIG. 1) were placed in each apartment for a total of 20 pairs. One shelter in each pair was pheromone-baited [VPCs: (E)-2-hexenal, (E)-2-octenal, dimethyl disulfide, dimethyl trisulfide, 2-hexanone (500 μg) plus histamine (2,000 μg)]; the other was left unbaited. Shelter placement and spacing within and between shelter pairs proceeded as described in EXAMPLE 14. Shelters were retrieved 24 h after the placement, immediately placed into labelled separate zipper lock bags and put on dry ice to kill all captured bed bugs.

In Experiment 80, 26 of 27 bed bugs captured were present in pheromone-baited shelters; only one bed bug was present in an unbaited control shelter. Shelter traps in all rooms in which at least one live bed bug was seen at the start of the experiment captured at least one bed bug.

These data indicate that the 6-component synthetic pheromone lure comprised of (E)-2-hexenal, (E)-2-octenal, dimethyl disulfide, dimethyl trisulfide, 2-hexanone and histamine is capable of attracting and retaining bed bugs in lightly-infested residential apartments and that this novel pheromone lure has the potential to become an effective tool for detecting bed bug infestations in residential and commercial premises.

This application is intended to cover any variations, uses, or adaptations of the invention using its general principles. Further, this application is intended to cover such departures from the present disclosure as come within known or customary practice in the art to which this invention pertains and which fall within the limits of the appended claims. Accordingly, the scope of the claims should not be limited by the preferred embodiments set forth in the description, but should be given the broadest interpretation consistent with the description as a whole.

REFERENCES

Boase, C. 2001. Bed bugs—back from the brink. Pesticide Outlook 12: 159-162.
Jones, S. C. 2004. Bed bugs. Ohio State University Extension FactSheet HYG-2105-04.
Myles, T., B. Brown, B. Bedard, R. Bhooi, K. Bruyere, A.-L. Chua, M. Macsai, R. Menezes, A. Salwan and M. Takahashi. 2003. Bed bugs in Toronto. University of Toronto Centre for Urban and Community Studies. Research Bulletin #19.
Potter, M. F. 2012. Bed bugs. University of Kentucky College of Agriculture, Cooperative Extension Service. Entfact-636.
Ter Poorten, M. C. and N. S. Prose. 2005. The return of the common bed bug. Pediatric Dermatology 22: 183-187.

The invention claimed is:

1. A bed bug control device comprising:
a composition comprising histamine in an effective amount at luring beg bugs; and
a gas-permeable sealed reservoir loaded with the composition,
wherein the histamine in the device arrests bed bugs.

2. The device of claim 1, wherein the composition further comprises volatile compounds.

3. The device of claim 2, wherein the volatile compounds comprise sulfides, aldehydes, and ketones.

4. The device of claim 3, wherein the volatile compounds comprise dimethyl disulfide, dimethyl trisulfide, (E)-2-hexenal, (E)-2-octenal, and 2-hexanone.

5. The device of claim 4, wherein the composition comprises, by weight, 0.5-99% dimethyl disulfide, 0.5-99% dimethyl trisulfide, 0.5-99% (E)-2-hexenal, 0.5-99% (E)-2-octenal, and 0.5-99% 2-hexanone.

6. The device of claim 4, wherein the composition is formulated as a slow-release lure.

7. The device of claim 2, wherein a ratio of the histamine to the volatile compounds is in a range of 1:1 to 40:1.

8. The device of claim 1, wherein the composition further comprises an effective amount of one or more additional compounds.

9. The composition of claim 8, wherein the one or more additional compounds are selected from the group consisting of butanal, pentanal, hexanal, benzaldehyde, benzyl alcohol, acetophenone, verbenone, ethyl octanoate, methyl octanoate, pentyl hexanoate, dimethylaminoethanol, N-acetylglucosamine, L-3-hydroxykynurenine O-sulfate, L-valine, L-alanine, octanal, nonanal, decanal, (E,E)-2,4-octadienal, (E,Z)-2,4-octadienal, benzyl acetate, (+)-limonene, (−)-limonene, 6-methyl-5-hepten-2-one (sulcatone), geranylacetone, carbon dioxide, 1-octen-3-ol, L-carvone, L-lactic acid, proprionic acid, butyric acid, valeric acid, oleic acid, palmitic acid, stearic acid, linoleic acid, lauric acid, capric acid, myristic acid, androstenone, 3-methyl indole, 1-docosanol, pentadecanoic acid, squalene, cholesterol, and 2,2-dimethyl-1,3-dioxolane-4-methanol.

10. The device of claim 1, wherein the histamine is a histamine base.

11. The device of claim 1, wherein the composition is formulated as a granule, powder, dust, paste, gel, suspension, emulsion or liquid solution.

12. The device of claim 1, wherein the composition is formulated as a slow-release lure.

13. The device of claim 1, wherein the composition comprises an active ingredient, the active ingredient consisting essentially of histamine, dimethyl disulfide, dimethyl trisulfide, (E)-2-hexenal, (E)-2-octenal and 2-hexanone.

14. The device of claim 1, wherein the composition comprises an active ingredient, the active ingredient consisting essentially of histamine, dimethyl disulfide, dimethyl trisulfide, (E)-2-hexenal, (E)-2-octenal and 2-hexanone combined with an effective amount of one or more additional compounds selected from the group consisting of butanal, pentanal, hexanal, benzaldehyde, benzyl alcohol, acetophenone, verbenone, ethyl octanoate, methyl octanoate, pentyl hexanoate, dimethylaminoethanol, N-acetylglucosamine, L-3-hydroxykynurenine O-sulfate, L-valine, L-alanine, octanal, nonanal, decanal, (E,E)-2,4-octadienal, (E,Z)-2,4-octadienal, benzyl acetate, (+)-limonene, (−)-limonene, 6-methyl-5-hepten-2-one (sulcatone), geranylacetone, carbon dioxide, 1-octen-3-ol, L-carvone, L-lactic acid, proprionic acid, butyric acid, valeric acid, oleic acid, palmitic acid, stearic acid, linoleic acid, lauric acid, capric acid, myristic acid, androstenone, 3-methyl indole, 1-docosanol, pentadecanoic acid, squalene, cholesterol, and 2,2-dimethyl-1,3-dioxolane-4-methanol.

15. The device of claim 1, wherein the gas-permeable sealed reservoir comprises an absorbent material impregnated with the composition.

16. The device of claim 15, wherein the absorbent material is a cellulose mat.

17. The device of claim 1, wherein the device is a detector, monitor or trap.

18. The device of claim 1, further comprising a source of heat and a source of carbon dioxide.

19. The device of claim 1, wherein the composition further comprises a pesticide that is lethal to the bed bugs.

20. A method of attracting and arresting bed bugs, the method comprising:
providing the device of claim 1 at a desired location,
wherein the device attracts and arrests the bed bugs, the bed bugs being common bed bugs, *Cimex lectularius*, or tropical bed bugs, *C. hemipterus*.

* * * * *